United States Patent
Goto

(10) Patent No.: US 12,464,154 B2
(45) Date of Patent: Nov. 4, 2025

(54) MOVING IMAGE CODING APPARATUS AND MOVING IMAGE CODING METHOD

(71) Applicant: JVCKENWOOD Corporation, Yokohama (JP)

(72) Inventor: Masaki Goto, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 191 days.

(21) Appl. No.: 17/580,492

(22) Filed: Jan. 20, 2022

(65) Prior Publication Data
US 2022/0150526 A1 May 12, 2022

Related U.S. Application Data

(63) Continuation of application No. PCT/JP2020/028102, filed on Jul. 20, 2020.

(30) Foreign Application Priority Data

Jul. 23, 2019 (JP) .................... 2019-135396

(51) Int. Cl.
*H04N 19/46* (2014.01)
*H04N 19/167* (2014.01)

(52) U.S. Cl.
CPC ........... *H04N 19/46* (2014.11); *H04N 19/167* (2014.11)

(58) Field of Classification Search
CPC ............. H04N 19/46; H04N 19/167; H04N 2005/91307; H04N 5/913; H04N 9/80; H04N 9/8205; H04N 21/435; H04N 21/84; H04N 19/85; H04N 5/92; H04N 19/42; G06F 21/64
See application file for complete search history.

(56) References Cited

U.S. PATENT DOCUMENTS

| 11,158,344 B1* | 10/2021 | Townsend ................ H04N 5/91 |
| 2019/0158698 A1* | 5/2019 | Chen ..................... H04N 19/85 |
| 2021/0297699 A1* | 9/2021 | Iguchi ................. H04N 19/184 |

FOREIGN PATENT DOCUMENTS

JP  2010-068318 A  3/2010

OTHER PUBLICATIONS

International Search Report for the corresponding PCT Application No. PCT/JP2020/028102 with English translation mailed Oct. 20, 2020, 4 pages.
International Preliminary Examination Report on Patentability (I) with an English translation mailed Jan. 25, 2022, 8 pages.

* cited by examiner

*Primary Examiner* — Tat C Chio
(74) *Attorney, Agent, or Firm* — Shih IP Law Group, PLLC

(57) ABSTRACT

A moving image coding apparatus adapted to code moving images including time-continuous frames is provided. A moving image coding unit outputs a coded bitstream in which the moving images are coded. A position information generation unit generates position information in a frame, based on time-continuity information indicating time continuity of the frames. A coded information acquisition unit acquires coded information on the moving images, based on the position information. An inspection information generation unit generates inspection information from the coded information. A multiplexing unit multiplexes the bitstream and the inspection information.

5 Claims, 3 Drawing Sheets

MOVING IMAGE CODING APPARATUS AND MOVING IMAGE CODING METHOD

BACKGROUND OF THE INVENTION

1. Field of the Invention

The present invention relates to moving image coding technology and moving image tampering identification technology for detecting tampering of moving images.

2. Description of the Related Art

Moving image coding technology has facilitated compression coding and saving of moving images and distribution of streams of moving images via a network. There has been a demand for increased security to prevent moving images from being tampered by a malicious third-party and for detection of tampering in the event that the moving images are tampered. In particular, moving images recorded in a drive recorder could possibly be used as police investigation information or as a court evidence in the event of an automobile accident or a crime. It is therefore necessary to guarantee that the images are not tampered.

Patent literature 1 discloses a moving image compression technology configured to embed, in the current frame, a code signal of a frame immediately preceding the current frame in order to detect tampering by replacement of the current frame only.

[Patent Literature 1] JP2010-68318

Moving image recorders such as drive recorders record moving images by dividing them into files at predetermined intervals. The moving image compression technology disclosed in Patent Literature 1 detects tampering by using the code signal of the frame immediately preceding the current frame. As such, the technology is incompatible with a compression coded moving image stream divided into files.

SUMMARY OF THE INVENTION

The present invention address the above-described issue, and a purpose thereof is to provide an image coding technology and a moving image tampering identification technology for detecting tampering of moving images properly.

The moving image coding apparatus (100) according to an embodiment of the present invention is a moving image coding apparatus (100) adapted to code moving images including time-continuous frames, including: a moving image coding unit (20) that outputs a coded bitstream in which the moving images are coded; a position information generation unit (14) that generates position information in a frame, based on time-continuity information indicating time continuity of the frames; a coded information acquisition unit (22) that acquires coded information on the moving images, based on the position information; an inspection information generation unit (30) that generates inspection information from the coded information; and a multiplexing unit (40) that multiplexes the bitstream and the inspection information.

Another embodiment of the present invention relates to a moving image coding method. The method is a moving image coding method adapted to code moving images including time-continuous frames, including: outputting a bitstream in which the moving images are coded; generating position information in a frame, based on time-continuity information indicating time continuity of the frames; acquiring coded information on the moving images, based on the position information; generating inspection information from the coded information; and multiplexing the bitstream and the inspection information.

Still another embodiment of the present invention relates to a moving image tampering identification method. The method is a moving image tampering identification method adapted to determine whether a coded stream in which moving images including time-continuous frames are coded is tampered, extracting inspection information from the coded stream; generating position information in a frame, based on time-continuity information indicating time continuity of the frames; acquiring coded information on the moving images from the coded stream, based on the position information; generating inspection information from the coded information; and determining whether the coded stream is tampered by comparing the inspection information extracted with the inspection information generated.

Optional combinations of the aforementioned constituting elements, and implementations of the invention in the form of methods, apparatuses, systems, recording mediums, and computer programs may also be practiced as additional modes of the present invention.

DETAILED DESCRIPTION OF THE INVENTION

The invention will now be described by reference to the preferred embodiments. This does not intend to limit the scope of the present invention, but to exemplify the invention.

Figure 1:
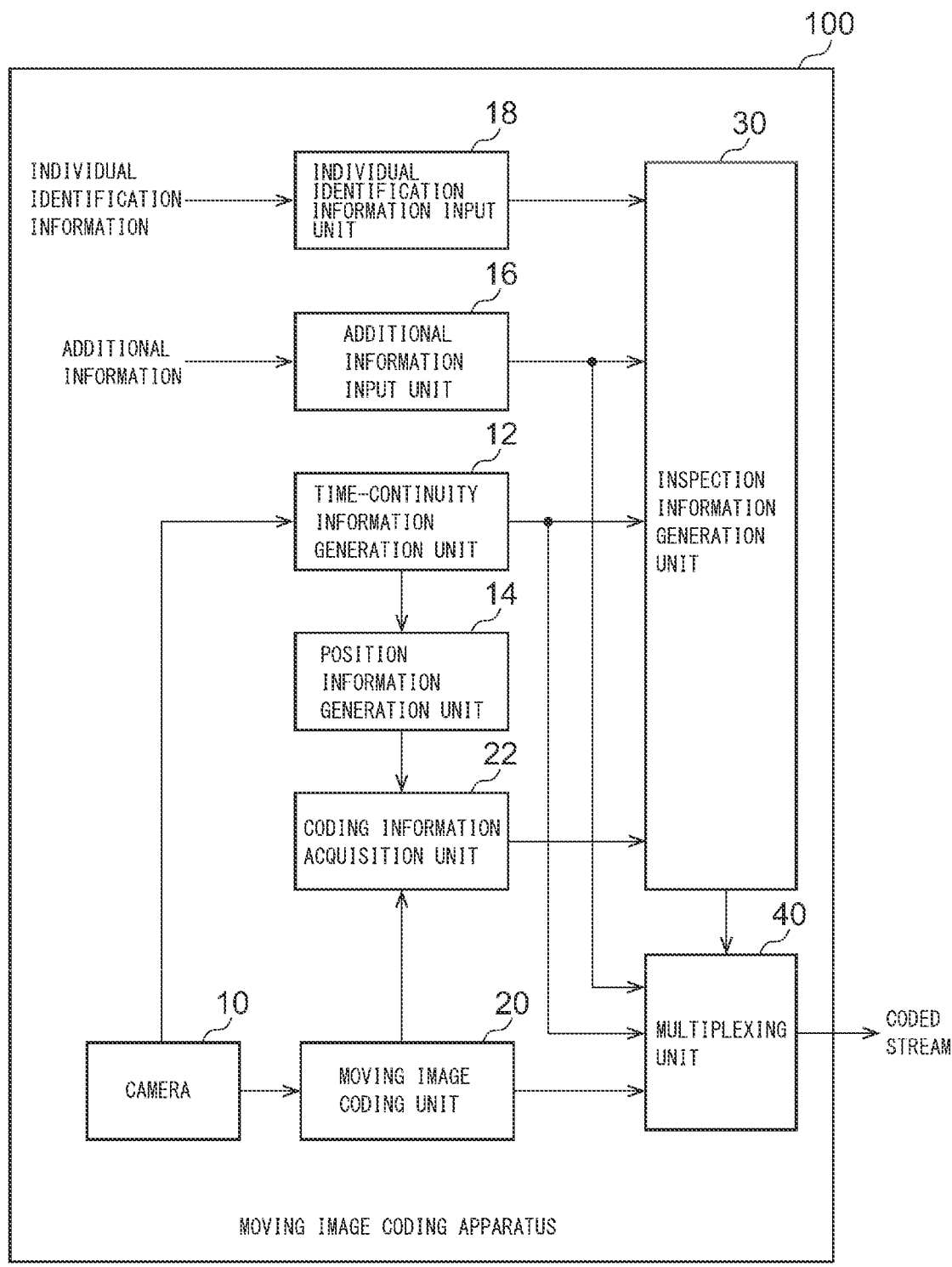
FIG. 1 is a diagram showing a configuration of a moving image coding apparatus according to the embodiment.

FIG. 1 is a diagram showing a configuration of a moving image coding apparatus 100 according to the embodiment of the present invention. The moving image coding apparatus 100 is mounted on or connected to a vehicle-mounted recorder (drive recorder) by way of one example, but the embodiment is not limited to this configuration. In the following description, it is assumed that the image input to the moving image coding apparatus 100 is an image capturing an outside scenery taken by a camera of a vehicle-mounted recorder.

The moving image coding apparatus 100 includes a camera 10, a time-continuity information generation unit 12, a position information generation unit 14, an additional information input unit 16, an individual identification information input unit 18, a moving image coding unit 20, a coded information acquisition unit 22, an inspection information generation unit 30, and a multiplexing unit 40.

The camera 10 is provided in the vehicle. The camera 10 images various traffic conditions on a road from the vehicle and supplies the frames of images taken to the moving image coding unit 20.

The moving image coding unit 20 codes the frames of images subject to coding by using any of various coding parameters in accordance with a standard such as MPEG, AVC, and HEVC to generate a bitstream and supplies the bitstream to the multiplexing unit 40.

Further, the camera 10 supplies information indicating the continuity of successive frames forming the image (e.g., information such as a time stamp synchronized with the taken image) to the time-continuity information generation unit 12.

The time-continuity information generation unit 12 generates time-continuity information based on the information such as the time stamp synchronized with the image. For example, given that the first frame is assigned a number (e.g., a frame number) 0x00000000, the next frame is assigned 0x00000001. In this way, the time-continuity information generation unit 12 continuously and incrementally counts the number by counting the number of picture frames subject to coding. The time-continuity information generation unit 12 supplies the incrementally counted number to the position information generation unit 14, the inspection information generation unit 30, and the multiplexing unit 40 as time-continuity information. The time-continuity information may be information that varies with time and is not necessarily a value that increases or decreases monotonically. The time-continuity information may be any numerical value that changes continuously according to a predetermined rule. By using the time-continuity information, tampering can be detected by identifying lost time-continuity even when tampering is effected by replacing frames in the images.

The position information generation unit 14 generates information indicating a predetermined position in a bitstream obtained by coding a frame subject to coding, based on the time-continuity information supplied from the time-continuity information generation unit 12. For example, the position information generation unit 14 generates position information indicating an x coordinate and a y coordinate in the frame.

To describe it more specifically, the position information generation unit 14 uses the input time-continuity information as an input value input to a hash function and converts the time-continuity information into a 32-bit hash value by using the hash function. Desirably, the hash function is a cryptographically safe one-way function. A function such as SHA-2, for which no collisions are found, is desirable.

Further, the position information generation unit 14 uses a portion of the hash vale and converts the portion into position information indicating, for example, a predetermined position in the frame. For example, a method of conversion into position information will be explained by using an HDTV image of 1920 pixels×1080 pixels as an example. SHA-256, which is a SHA-2 standard for 256-bit output, is used to divide the 256 bits (32 bytes) of the output value into higher/lower 16 bytes. The lower 2 bytes of the higher 16 bytes are defined to indicate the x coordinate, and a remainder operation that uses 1920 as a modulo is performed to find the x coordinate value. The lower 2 bytes of the lower 16 bytes are defined to indicate the y coordinate, and a remainder operation that uses 1080 as a modulo is performed to find the y coordinate value.

The position information in the HDTV image of 19020 pixels×1080 pixels is obtained in the form of the x coordinate value and the y coordinate value thus obtained. The position information may be information designating the position of a pixel denoted by the x coordinate value and the y coordinate value. Alternatively, the position information may be information identifying a coded block (e.g., a block of 16 pixels×16 pixels) including the pixel designated by the x coordinate value and the y coordinate value. Still alternatively, the position information may designate the number of bytes from a reference position in each frame on the coded bitstream.

As discussed, inputting the time-continuity information in the one-way function causes the position information in the frame to change randomly so that the safety of the inspection information generated based on the position information can be increased.

The position information generation unit 14 is described above as converting the time-continuity information into the position information by using a one-way function such as a hash function. Alternatively, position information may be generated by applying a simpler predetermined process to the time-continuity information. Still alternatively, the time-continuity information may be directly used as the position information. Security may be increased by implementing the predetermined process by employing a conversion scheme unique to each manufacturer. The predetermined process may be addition of an error detection code to the time-continuity information or addition, to the time-continuity information, of a result of subjecting designated bits of the time-continuity information to addition/subtraction/multiplication/division.

The coded information acquisition unit 22 refers to the position information generated by the position information generation unit 14 and receives, from the moving image coding unit 20, the coded information on the pixel at the x coordinate and y coordinate designated in the frame subject to coding or on the coded block including that pixel. The coded information may be data extracted at the position in the coded image bit stream indicated by the position information. Alternatively, the coded information may be information related to coding such as a quantization parameter, prediction mode information, and a motion vector in the coded block designated by the position information.

One example of a quantization parameter is a quantization scale. A quantization scale is a scalar multiple value used when data from orthogonal transform of each macroblock is quantized by dividing the data in the two-dimensional frequency domain.

With regard to prediction mode information, two types of prediction sizes are available for intra prediction coding in the MAIN profile of 264/AVC. 9 types of prediction modes (prediction mode 0-prediction mode 8) are available for 4×4 blocks, and four types of prediction modes (prediction mode 0-prediction mode 3) are available for 16×16 blocks. Information for identifying these prediction modes is used as prediction mode information.

The coded information acquisition unit 22 supplies the coded information extracted from the frame subject to coding to the inspection information generation unit 30.

The additional information input unit 16 acquires additional information relating to the traveling condition of the vehicle such as the position, speed, acceleration, accelerator position, steering angle of the vehicle and supplies the additional information to the inspection information generation unit 30 and the multiplexing unit 40.

The individual information input unit 18 acquires the individual identification information that is a unique number linked to the device serial number of the drive recorder and managed accordingly and supplies the individual identification information to the inspection information generation unit 30.

The inspection information generation unit 30 generates inspection information from the coded information supplied from the coded information acquisition unit 22. The inspection information generation unit 30 may generate inspection information by combining at least one of the time-continuity information supplied from the time-continuity information generation unit 12, the additional information supplied from the position information generation unit 14, and the individual identification information supplied from the individual identification information input unit 18 with the coded information. A plurality of items of inspection information may be generated from a plurality of combinations.

To be more specific, the inspection information generation unit 30 uses a one-way function such as a hash function to convert the coded information or the data derived from combining at least one of the time-continuity information, the additional information, and the individual identification information with the coded information into the inspection information. The inspection information generation unit 30 supplies the generated inspection information to the multiplexing unit 40. The inspection information generation unit 30 may apply, for conversion into the inspection information, a simpler predetermined process to the coded information or the data derived from combining at least one of the time-continuity information, the additional information, and the individual identification information with the coded information. It is desired that a one-way function such as a hash function is used in either the inspection information generation unit 30 or the position information generation unit 14.

The multiplexing unit 40 multiplexes the bitstream supplied from the moving image coding unit 20 and the inspection information supplied from the inspection information generation unit 30 and outputs a coded bitstream. In the case of the H.264/AVC standard, for example, the inspection information may be stored in Supplemental Enhancement Information (SEI).

Further, the multiplexing unit 40 multiplexes the time-continuity information supplied from the time-continuity information generation unit 12 in the bitstream. The time-continuity information is information showing continuity from the previous frame and is generated in accordance with a predetermined rule. Therefore, it is not necessary to multiplex the time-continuity information in each frame. In the case moving images are divided into a plurality of files and recorded accordingly, however, the time-continuity information is inserted and multiplexed in the leading frame in the respective files. This ensured that, even if the moving images are divided into a plurality of files, tampering by replacement of frames can be detected by using the time-continuity information.

When the inspection information generation unit 30 combines the additional information with the coded information to generate the inspection information, the multiplexing unit 40 further multiplexes the additional information supplied from the additional information input unit 16 in the bitstream. When the additional information is not used to generate the inspection information, it is not necessary to multiplex the additional information in the bitstream.

Figure 2:
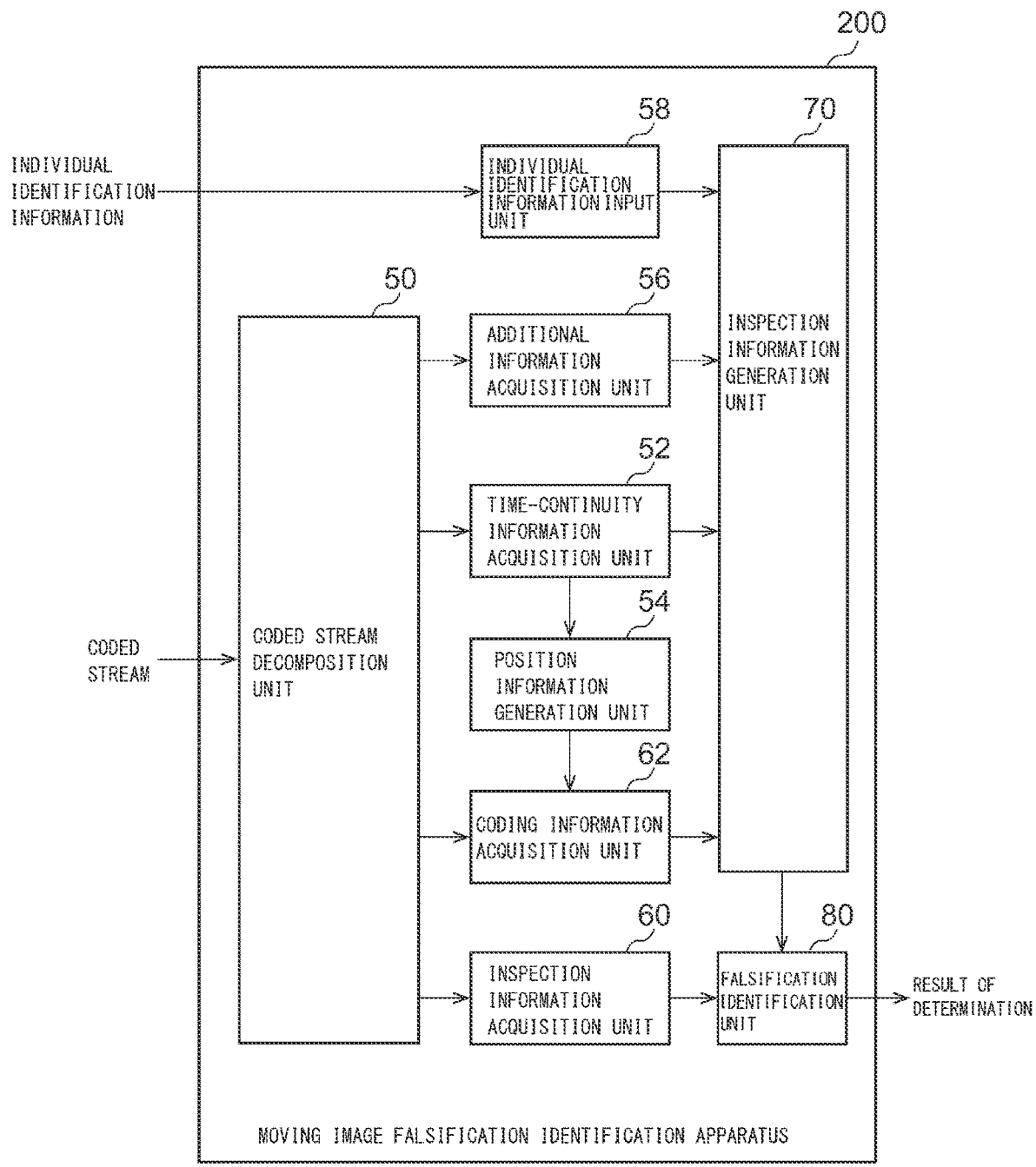
FIG. 2 shows a configuration of a moving image tampering identification apparatus according to the embodiment.

FIG. 2 shows a configuration of a moving image tampering identification apparatus 200 according to the embodiment of the present invention.

The moving image tampering identification apparatus 200 includes a coded stream decomposing unit 50, a time-continuity information acquisition unit 52, a position information generation unit 54, an additional information acquisition unit 56, an individual information input unit 58, an inspection information acquisition unit 60, a coded information acquisition unit 62, an inspection information generation unit 70, and a tampering identification unit 80.

The coded stream output from the moving image coding apparatus 100 of FIG. 1 is input to the coded stream decomposition unit 50 of the moving image tampering identification apparatus 200. The individual identification information on the vehicle or the drive recorder used in the moving image coding apparatus 100 is input to the individual information input unit 58 of the moving image tampering apparatus 200.

The coded stream decomposition unit 50 isolates and outputs the bitstream, coded information, inspection information, time-continuity information, and additional information multiplexed in the coded bitstream.

The inspection information acquisition unit 60 extracts the inspection information multiplexed in the coded stream and supplies the extracted inspection information to the tampering identification unit 80.

The time-continuity information acquisition unit 52 extracts the time-continuity information multiplexed in the coded stream and generates the time-continuity information according to the predetermined rule used in the time-continuity information generation unit 12 of the moving image coding apparatus 100. Since the time-continuity information is not inserted in all of the frames, it is necessary to generate the time-continuity information in accordance with the predetermined rule for frames in which the time-continuity information is not inserted. The time-continuity information acquisition unit 52 supplies the time-continuity information to the position information generation unit 54 and the inspection information generation unit 70.

The position information generation unit 54 uses the one-way function used in the moving image coding apparatus 100 to convert the time-continuity information into the position information in the frame and supplies the position information to the coded information acquisition unit 22.

The coded information acquisition unit 62 extracts the coded information from the coded stream based on the position information supplied from the position information generation unit 54. When the position information designates the number of bytes from the reference position in the coded stream, the coded information acquisition unit 62 extracts data at the designated location from the coded stream, as the coded information. When the position information is comprised of the x coordinate value and the y coordinate value in the frame, the coded information acquisition unit 62 decodes the bitstream to extract information relating to coding such as a quantization parameter, prediction mode information, and a motion vector from the pixel at the designated coordinates in the decoded frame or the coded block including that pixel.

The coded information acquisition unit 62 supplies the coded information extracted from the coded stream to the inspection information generation unit 70.

When the additional information is multiplexed in the coded stream, the additional information acquisition unit 56 extracts the additional information from the coded stream and supplies the extracted information to the inspection information generation unit 70.

The individual identification information input unit 58 supplies the input individual identification information to the inspection information generation unit 70.

The inspection information generation unit 70 generates the inspection information from the coded information supplied from the coded information acquisition unit 62. More specifically, the inspection information generation unit 70 converts the coded information into the inspection information by using the one-way function used in the inspection information generation unit 30 of the moving image coding apparatus 100.

In the case at least one of the time-continuity information, additional information, and individual identification information is combined with the coded information when the moving image coding apparatus 100 generates the inspection information, the inspection information generation unit 70 combines at least one of the time-continuity information supplied from the time-continuity information acquisition unit 52, the additional information supplied from the additional information acquisition unit 56, and the individual identification information supplied from the individual information input unit 58 with the coded information to generate the inspection information.

The inspection information generation unit 70 supplies the inspection information thus generated to the tampering identification unit 80.

The tampering identification unit 80 compares the inspection information extracted by the coded information acquisition unit 62 with the inspection information generated by the inspection information generation unit 70. When a match is found, the tampering identification unit 80 determines that there is no tampering. When a mismatch is found, the tampering identification unit 80 determines that there is tampering and outputs the result of determination.

Figure 3:
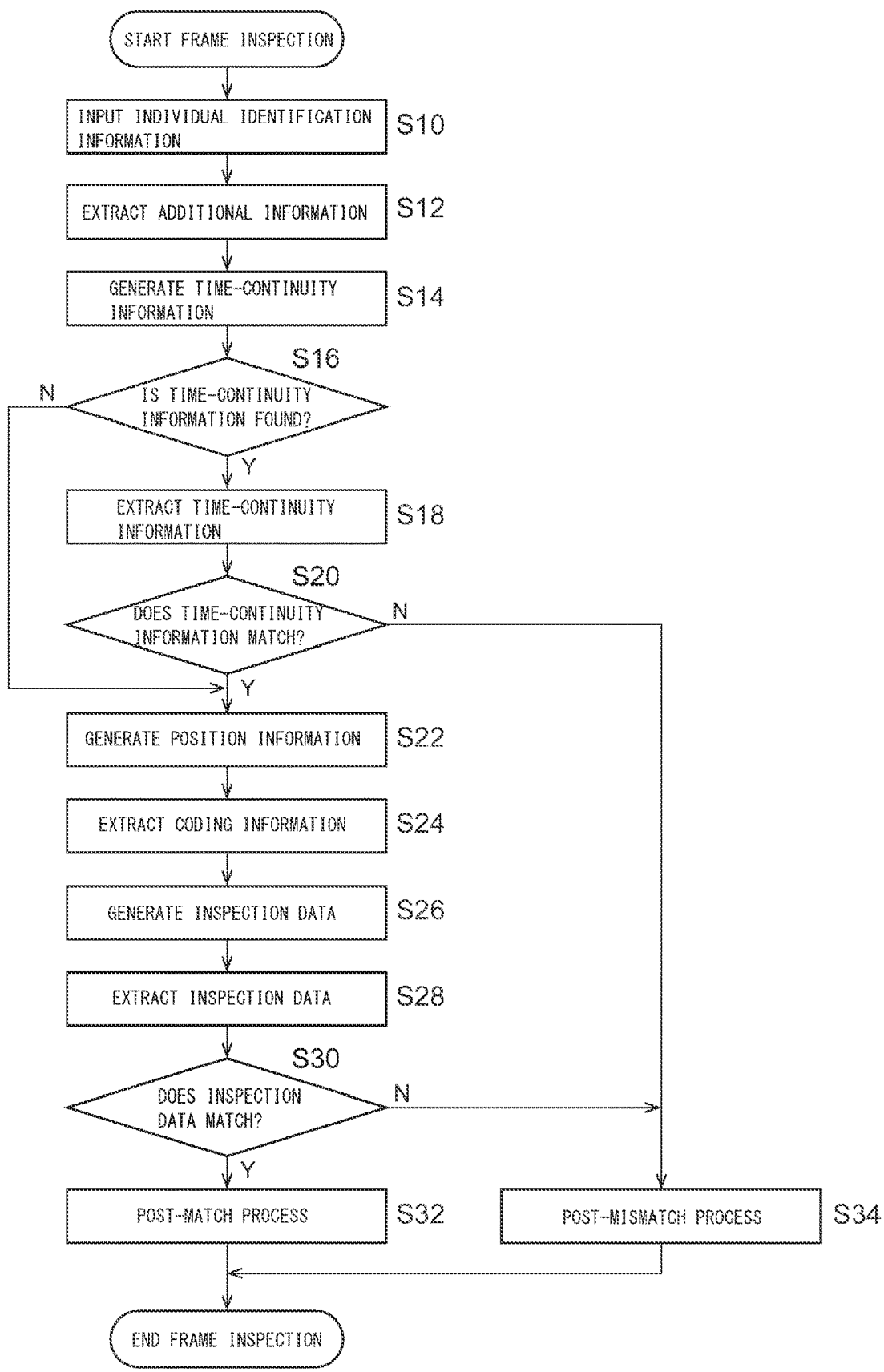
FIG. 3 is a flowchart illustrating a moving image tampering determination method according to the embodiment.

FIG. 3 is a flowchart illustrating a moving image tampering determination method performed by the moving image tampering identification apparatus 200.

A description will be given of a process for identifying tampering of each frame in the coded stream input to the moving image tampering identification apparatus 200.

The individual identification information input unit 58 receives an input to of the individual identification information on the vehicle or the driver recorder (S10). The process of inputting the individual identification information need not be performed for each frame but is performed only for the first frame of the coded stream.

The additional information acquisition unit 56 extracts the additional information multiplexed in the coded stream (S12). The process of extracting the additional information is performed only when the additional information is multiplexed in the coded stream.

The time-continuity information acquisition unit 52 generates the time-continuity information from the time-continuity information of the previous frame in accordance with the predetermined rule (S14).

The time-continuity information acquisition unit 52 determines whether the time-continuity information is inserted in the frame of the coded stream subject to decoding (S16). When the time-continuity information is found (Y in S16), the time-continuity information acquisition unit 52 extracts the time-continuity information from the coded stream (S18). When the time-continuity information is not found (N in S16), steps S18, S20 are skipped, and control proceeds to step S22.

The time-continuity information acquisition unit 52 compares the time-continuity information extracted from the coded stream with the time-continuity information generated from the time-continuity information of the previous frame in accordance with the predetermined rule and determines whether a match is found between the time-continuity information (S20). When a match is found between the time-continuity information (Y in S20), control proceeds to step S22. When a mismatch is found between the time-continuity information (N in S20), control proceeds to step S34.

The position information generation unit 54 generates the position information from the time-continuity information generated in step S14 (S22).

The coded information acquisition unit 62 extracts the coded information from the coded stream, based on the position information generated in step S22 (S24).

The inspection information acquisition unit 60 extracts the inspection information multiplexed in the coded stream (S26).

The inspection information generation unit 70 generates the inspection information from the coded information extracted in step S24 (S28). In the case the inspection information is generated by the inspection information generation unit 30 of the moving image coding apparatus 100 by combining at least one of the time-continuity information, additional information, and individual identification information with the coded information, the inspection information generation unit 70 generates the inspection information by combining at least one of the time-continuity information generated in step S14, the additional information extracted in step S12, and the individual identification information input in step S10 with the coded information.

The tampering identification unit 80 compares the inspection information extracted in step S26 with the inspection information generated in step S28 (S30). When a match is found between the inspection information (Y in S30), control proceeds to step S32. When a mismatch is found between the inspection information (N in S30), control proceeds to step S34.

The tampering identification unit 80 communicates or records that the frame is not tampered as part of the process performed after a match is found in the inspection information (S32).

The tampering identification unit 80 communicates or records that the frame is tampered as part of the process performed after a mismatch is found in the inspection information (S34).

When the process performed after a match is found (S32) in the inspection information of the frame or the process performed after a mismatch is found (S34) is completed, the process of identifying tampering of the current frame is completed, and control proceeds to the process for identifying tampering of the next frame in the coded stream.

The above-described processes can of course be implemented by hardware-based apparatus such as a CPU and a memory and can also be implemented by firmware stored in a read-only memory (ROM), a flash memory, etc., or by software on a computer, etc. The firmware program or the software program may be made available on, for example, a computer readable recording medium. Alternatively, the program may be made available from a server via a wired or wireless network. Still alternatively, the program may be made available in the form of data broadcast over terrestrial or satellite digital broadcast systems.

As described above, the embodiment of the present invention uses time-continuity information. Even if a particular frame is tampered by being replaced by another frame, therefore, it is possible to identify tampering by extracting the time-continuity information of the frame and comparing it with the time-continuity information generated according to the predetermined rule. It is also possible to prove the continuity in the temporal direction by examining the time-continuity information. In other words, it is possible to properly determine whether a frame is tampered and whether continuity of frames in the temporal direction is found.

In a mode in which moving images are divided into a plurality of files as in a driver recorder, in particular, tampering by replacement of frames in the moving images divided into files can be detected by using time-continuity information, by inserting and multiplying the time-continuity information in the leading frame in the file.

In further accordance with the embodiment of the present invention, the position of acquisition of the inspection information changes randomly by using the coded information extracted, based on the time-continuity data, from positions that differ for each frame of the moving images. It is therefore extremely difficult to tamper the image, and the difficulty of post-tampering falsification can be increased. In particular, conversion of the time-continuity information into the position information by a one-way function results in the position information varying significantly from frame to frame and makes it impossible to predict the rule of the position information itself. Accordingly, the security is improved.

In still further accordance with the embodiment of the present invention, the inspection information generated by using the coded information is multiplexed in the coded stream. This does not require a special process in the moving image encoder and makes it possible to use a general-purpose encoder. Accordingly, dependency on particular hardware is eliminated, and the process is inhibited from becoming complicated.

Given above is an explanation based on an exemplary embodiment. The embodiment is intended to be illustrative only and it will be understood by those skilled in the art that various modifications to constituting elements and processes could be developed and that such modifications are also within the scope of the present invention.

What is claimed is:

1. A moving image coding apparatus adapted to code moving images including time-continuous frames, comprising:
   a moving image coding unit that outputs a coded bitstream in which the moving images are coded;
   a position information generation unit that generates position information in a frame, based on time-continuity information indicating time continuity of the time-continuous frames, the time-continuity information being a value that varies with time and the position information indicating a different position for each frame;
   a coded information acquisition unit that acquires coded information on the moving images, which is extracted from the different position for each frame based on the position information;
   an inspection information generation unit that generates inspection information for detecting tampering of the moving image by identifying lost time-continuity from the coded information and the time-continuity information that is used to generate the position information; and
   a multiplexing unit that multiplexes the coded bitstream and the inspection information, wherein
   the position information generation unit converts the time-continuity information by using a hash function so as to generate the position information in the frame indicating an x coordinate and a y coordinate that changes randomly for each frame.

2. The moving image coding apparatus according to claim 1, wherein
   the moving image coding apparatus is mounted on a vehicle; and
   the inspection information generation unit generates the inspection information by combining the coded information and additional information related to vehicle travel.

3. The moving image coding apparatus according to claim 1, wherein
   when the moving images are divided into a plurality of files, the multiplexing unit multiplexes the time-continuity information in a leading frame of each file.

4. A moving image coding method adapted to code moving images including time-continuous frames, comprising:
   outputting a bitstream in which the moving images are coded;
   generating position information in a frame, based on time-continuity information indicating time continuity of the time-continuous frames, the time-continuity information being a value that varies with time and the position information indicating a different position for each frame;
   acquiring coded information on the moving images, which is extracted from the different position for each frame based on the position information;
   generating inspection information for detecting tampering of the moving image by identifying lost time-continuity from the coded information and the time-continuity information that is used to generate the position information; and
   multiplexing the bitstream and the inspection information, wherein
   the generating position information converts the time-continuity information by using a hash function so as to generate the position information in the frame indicating an x coordinate and a y coordinate that changes randomly for each frame.

5. The moving image coding apparatus according to claim 2, wherein
   the additional information is either one of a position, speed, acceleration, accelerator position, and steering angle of the vehicle.

* * * * *